US012762755B1

(12) United States Patent
Lutter

(10) Patent No.: US 12,762,755 B1
(45) Date of Patent: Oct. 13, 2026

(54) TRANSFORMER-BASED VIRTUAL BACKGROUND CREATION

(71) Applicant: Zoom Communications, Inc., San Jose, CA (US)

(72) Inventor: Jan Lutter, North Rhine-Westphalia (DE)

(73) Assignee: Zoom Communications, Inc., San Jose, CA (US)

( * ) Notice: Subject to any disclaimer, the term of this patent is extended or adjusted under 35 U.S.C. 154(b) by 127 days.

(21) Appl. No.: 18/428,884

(22) Filed: Jan. 31, 2024

(51) Int. Cl.

| | |
|---|---|
| ***G06T 11/00*** | (2026.01) |
| ***G06V 20/40*** | (2022.01) |
| ***G06V 40/10*** | (2022.01) |
| ***G06V 40/20*** | (2022.01) |
| ***G10L 15/183*** | (2013.01) |
| ***G10L 15/30*** | (2013.01) |

(52) U.S. Cl.
CPC .............. *G06T 11/00* (2013.01); *G06V 20/41* (2022.01); *G06V 20/46* (2022.01); *G06V 40/10* (2022.01); *G06V 40/20* (2022.01); *G10L 15/183* (2013.01); *G10L 15/30* (2013.01)

(58) Field of Classification Search
None
See application file for complete search history.

(56) References Cited

U.S. PATENT DOCUMENTS

| | | | | |
|---|---|---|---|---|
| 10,003,769 | B2 | 6/2018 | Kim et al. | |
| 11,546,550 | B2 | 1/2023 | Pollefeys | |
| 2023/0254412 | A1 | 8/2023 | Jorasch et al. | |
| 2024/0056322 | A1* | 2/2024 | Kare | H04L 12/1827 |
| 2024/0355019 | A1* | 10/2024 | Assouline | G06V 40/161 |
| 2025/0148816 | A1* | 5/2025 | Gusarov | G06V 20/70 |
| 2025/0200843 | A1* | 6/2025 | Wilson | G06T 7/60 |

* cited by examiner

*Primary Examiner* — Yi Wang
(74) *Attorney, Agent, or Firm* — Young Basile Hanlon & MacFarlane, P.C.

(57) ABSTRACT

A server converts, using a natural language processing engine, a natural language input into an image generation prompt for a virtual background of a video conference. The server generates, using an image generation engine, the virtual background based on the image generation prompt. The server generates a composite image comprising at least one feature overlaying the virtual background. The server transmits for display, in a visual output associated with the video conference, the composite image.

22 Claims, 10 Drawing Sheets

TRANSFORMER-BASED VIRTUAL BACKGROUND CREATION

FIELD

This disclosure generally relates to artificial intelligence, and, more specifically, to use of a transformer architecture in generating a virtual background for a video conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
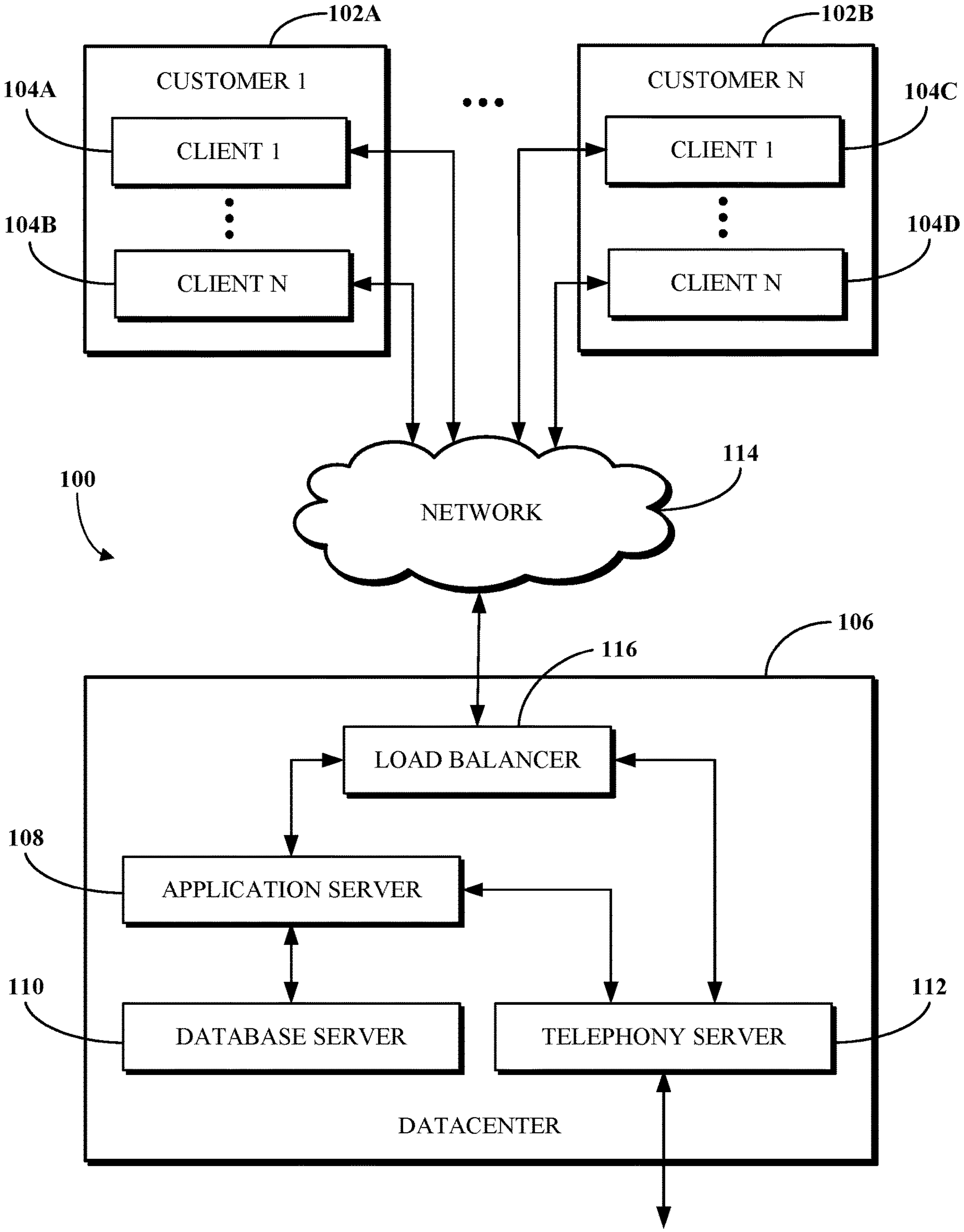
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

A user of video conferencing software may desire to use a virtual background, for example, to conceal their real background for privacy reasons, to prevent sensitive background materials from being visible, or to appear as though they are in a different location. Conventional video conferencing approaches may allow the user to select an image or a moving graphic (e.g., from a local memory of their client device) to use as the virtual background. However, the selectable options for the virtual background might not be relevant to video conferences that the user attends, and the user may not be able in some cases to identify or obtain a more suitable image or moving graphic to use. Techniques for generating virtual backgrounds that are relevant to the content of video conferences may be desirable.

Implementations of this disclosure address problems such as these by using a transformer neural network architecture to generate a virtual background for a video conference based on a natural language input associated with the video conference. According to some implementations, a server receives a natural language input related to the video conference. In some cases, the natural language input is typed or spoken by a host of the video conference and includes specific instructions (e.g., "a virtual background image of the Grand Canyon during a summer sunrise"). Alternatively, the natural language input may be at least one of a title of the video conference, an agenda of the video conference or of similar video conferences (with the similar video conferences being identified, for example, based on the title or the attendees), natural language data associated with at least one of a host or a participant of the video conference, words spoken during the video conference, or text typed in a test-based chat of the video conference. (It should be noted that the virtual background may change during the video conference, for example, based on what is being discussed in the video conference.)

A natural language processing (NLP) engine (e.g., a generative pretrained transformer (GPT) or a large language model (LLM)) converts the natural language input into an image generation prompt for the virtual background. The image generation prompt is optimized, by the NLP engine, to cause an image generation engine to generate the virtual background. For example, the NLP engine may be trained using prompts provided to the image generation engine that resulted in "good" virtual background images, as described in greater detail below.

The sever generates, using the image generation engine, the virtual background based on the prompt. In some implementations, the image generation engine is decoder-only transformer that autoregressively generates the virtual background. (Autoregressive generation may refer, among other things, to each pixel in the virtual background being generated based on each previously generated pixel.) The server transmits the virtual background for display at client devices connected to the conference within a composite image. The composite image includes a human body feature (e.g., at least one of a face, a torso, an arm, or a leg) overlaying the virtual background.

Different types of virtual backgrounds could be generated using the disclosed technology. For example, a virtual background may include a still image or a moving graphic that repeats once every threshold time period (e.g., two seconds). Alternatively, the artificial intelligence technology disclosed herein may be used to generate a constantly-moving video virtual background that does not repeat. For example, a virtual background of a forest scene may include a synthetic video of tree branches moving in the wind, birds flying, and/or animals frolicking in different non-repetitive ways.

To describe some implementations in greater detail, reference is first made to examples of hardware and software structures used to implement a system for transformer-based virtual background creation. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
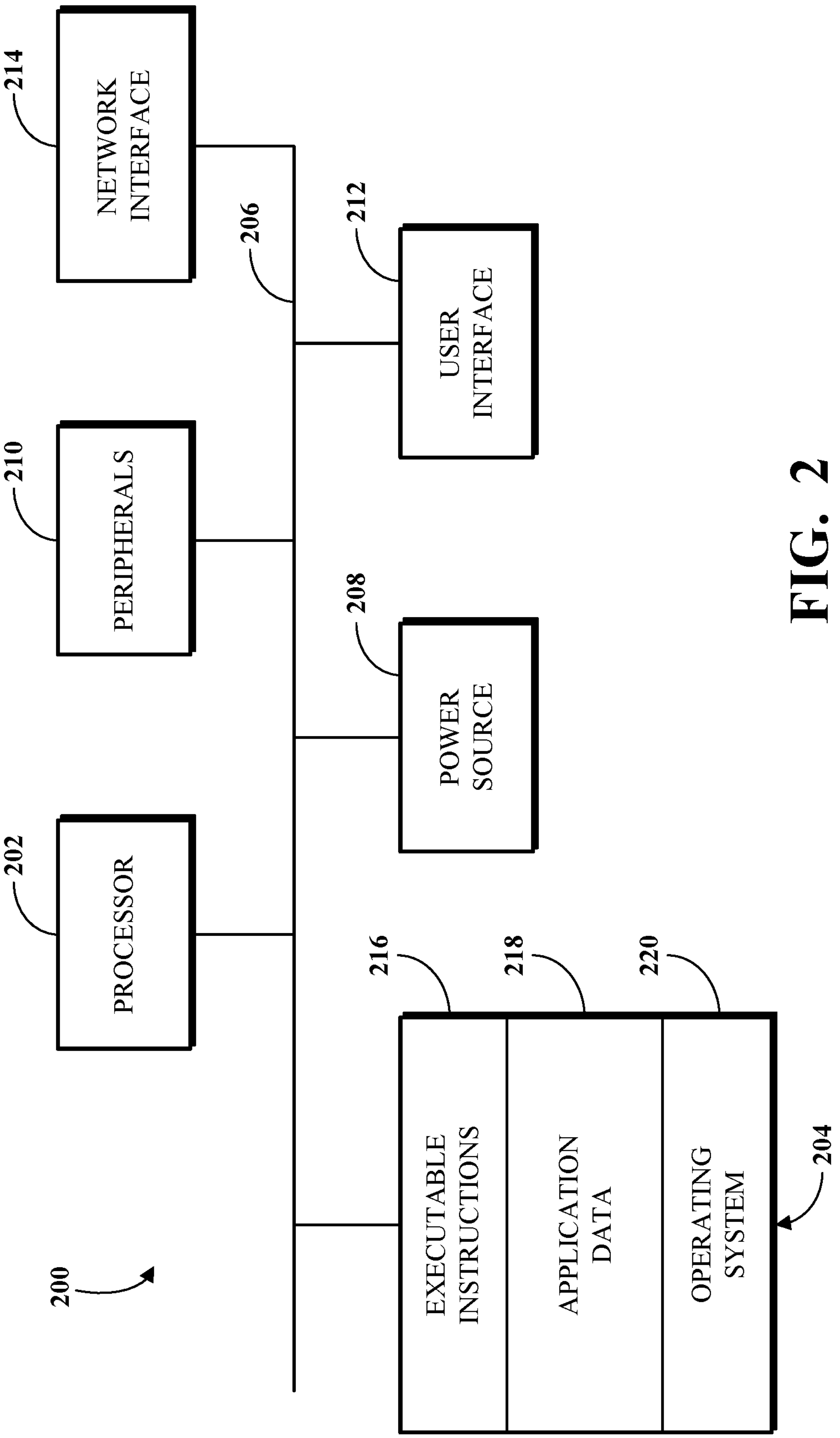
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
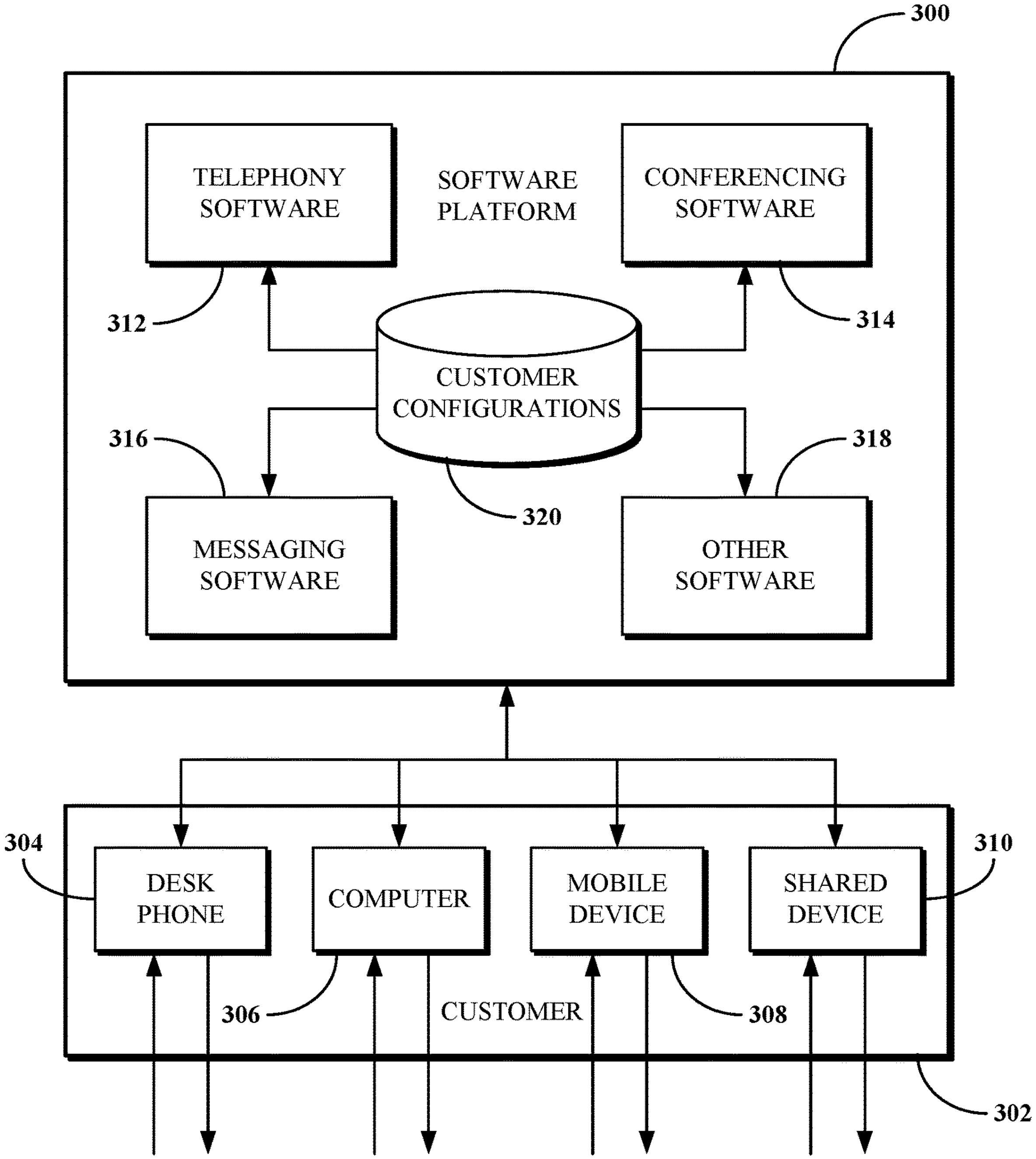
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients, including the desk phone 304, the computer 306, the mobile device 308, and the shared device 310, includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients and other telephony-enabled devices, which may be other ones of the clients, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for virtual background creation.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients.

Figure 4:
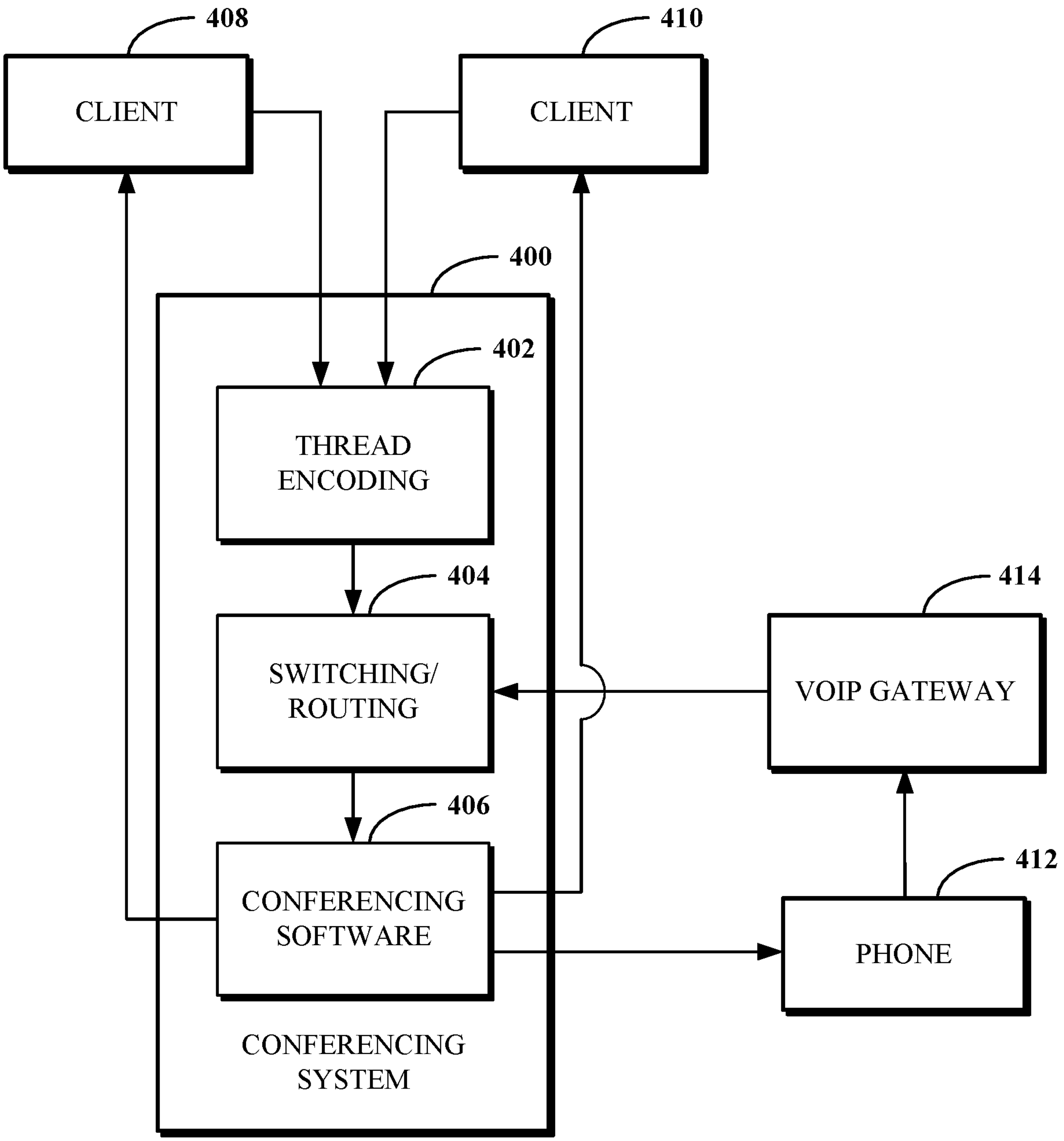
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may, for example, the conferencing software 314 shown in FIG. 3, is software for implementing conferences (e.g., video conferences) between users of clients and/or phones, such as clients 408 and 410 and phone 412. For example, the clients 408 or 410 may each be one of the clients shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant access the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 direct the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video stream for any portion of the conference. In some cases, however, the conference may have video disabled, such as where each participant connects to the conference using a phone rather than a client, or where a host of the conference selectively configures the conference to exclude video functionality.

Figure 5:
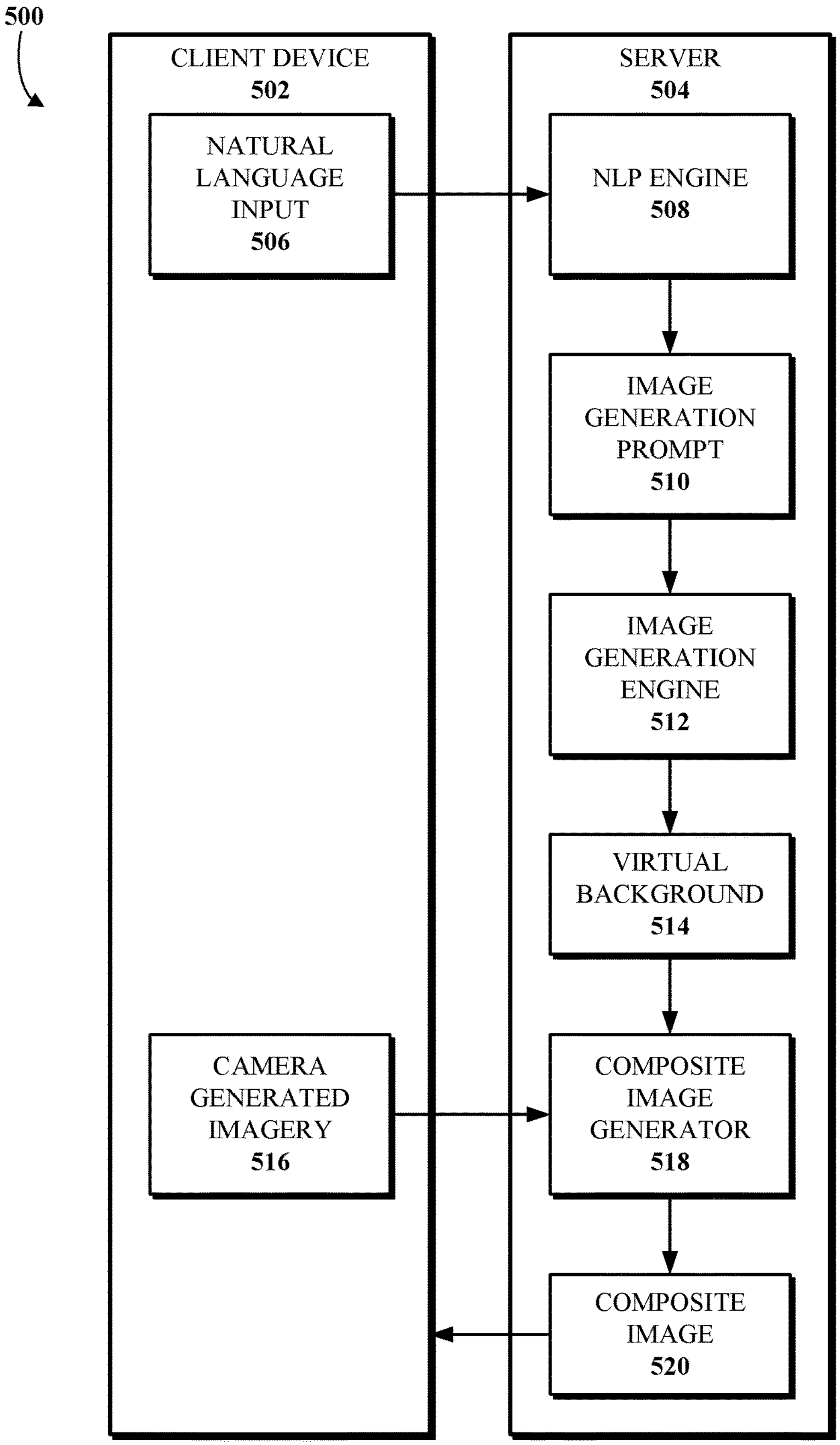
FIG. 5 is a block diagram of an example of a system for virtual background creation for video conferencing.

FIG. 5 is a block diagram of an example of a system 500 for virtual background creation for video conferencing. As shown, the system 500 includes a client device 502 and a server 504. The client device 502 may correspond to one of the clients 408, 410. The server 504 may correspond to a server of the conferencing system 400 and may include at least one of the thread encoding tool 402, the switching/routing tool 404, or the conferencing software 406. For example, the client device 502 may be a mobile phone, tablet computer, laptop computer, or desktop computer that is currently connected (or is to be connected at a future time) to a video conference via the server 504.

As shown, the client device 502 generates a natural language input 506 and transmits the natural language input 506 to the server 504. The natural language input 506 may be an input generated by a user of the client device describing a virtual background for a video conference. For example, the natural language input 506 may include the text, "a virtual background showing the Golden Gate Bridge on a sunny spring day," and/or an audio or video recording of the user of the client device 502 saying this phrase.

Alternatively, the natural language input 506 might not be explicitly provided, by the user of the client device 502, for the purpose of generating the virtual background. The natural language input 506 may include at least one of title of the video conference, an agenda of the video conference, natural language data associated with at least one of a host or a participant of the video conference, words spoken during the video conference, or text typed in a test-based chat session of the video conference. For example, if the video conference is titled, "Planning corporate retreat to Key West," the title may correspond to the natural language input. Alternatively, words spoken during the video conference or typed into a chat interface of the video conference may correspond to the natural language input, in addition to or in place of the title.

At the server 504, the natural language input 506 is provided to a NLP engine 508. The NLP engine 508 may be implemented using NLP technology, for example, LLM or GPT technology. The NLP engine 508 generates an image generation prompt 510 based on the natural language input 506. In some implementations, the image generation prompt 510 corresponds to key words of the natural language input 506 that are associated with imagery. The key words may include geographic locations, nouns, or noun-phrases that are associated with imagery. Examples of such key words include "Key West," "Aspen," "camels in desert on sunny day," "monsoon," "jungle thunderstorm," or "coffee shop." In some implementations, the NLP engine 508 is trained to generate image generation prompts based on a set of image generation prompts that generated "good" imagery (e.g., as identified by human users). It should be noted that, in some cases, the natural language input 506 may include inappropriate language, such as language associated with adult activities or bias against a protected class. The NLP engine 508 ensures that the inappropriate language is not included in the image generation prompt 510. In some implementations, the NLP engine 508 is a GPT engine.

In some cases, the GPT engine that is trained using a multi-phase process (e.g., that includes two or more phases) including the phases of pretraining and finetuning. In the pretraining phase, the GPT engine is trained on a dataset of publicly available (e.g., from the Internet) text or audio/video data that is converted into text using speech-to-text technology. The dataset of publicly available text may include text that is distinct from natural language inputs typically provided to the NLP engine 508. For example, the dataset of publicly available text may include at least one of newspaper articles, blog posts, publicly available social media post, or encyclopedia articles. The text is used to create a language model that learns to predict the next word in a sentence given the context of the previous words. The transformer architecture, specifically the self-attention mechanism, is used to capture dependencies between words and create a representation of the text.

During pretraining, the GPT engine learns to generalize the patterns it observes in the training data. Specifically, the GPT engine learns grammar, facts, reasoning abilities, and some level of world knowledge. The pretraining phase allows the GPT engine to acquire a broad understanding of the natural languages in which the GPT engine is trained. It should be noted that the GPT may be trained in multiple natural languages, such as English, Spanish, and/or Chinese.

During the finetuning phase, after pre-training, the GPT engine is further finetuned on specific tasks (e.g., generating an image generation prompt based on a natural language input associated with a video conference) using labeled examples. The labeled examples may be publicly available recordings of video conferences, and manually (e.g., by a human user) generated prompts for relevant virtual backgrounds. The labeled examples may include labels of desired outputs that the GPT is to generate based on the inputs. For example, a natural language input in the training data may include a title of a conference "real estate investing in Texas," a transcript of a conference about real estate investing in Texas. The output image generation prompt for this natural language input may correspond to a part of the title (e.g., "real estate" or "Texas") or image generation prompts related to real estate (e.g., "house" or "apartment building") or Texas (e.g., "The Alamo"). The finetuning phase makes the GPT engine useful for specific applications, such as providing image generation prompts based on natural language input of a video conference. Finetuning involves training the GPT engine on a narrower dataset that may be generated with the help of human reviewers.

The finetuning phase includes providing prompts or instructions to the GPT engine and receiving responses from the GPT engine. For example, a human reviewer may generate a set of simulated natural language texts associated with video conferences (e.g., conference audio transcripts, in-conference chat transcripts, and/or video conference titles). The human reviewers then review the output (i.e., the image generation prompts) generated by the GPT engine and score the output according to the various qualities (e.g., did the GPT engine generate outputs that are associated with prompts that could generate "good" virtual backgrounds for the video conference that are appropriate and relevant to the topic of the video conference). The GPT engine uses reinforcement learning to attempt to improve its scores on each (or at least a subset) of the qualities as the finetuning process progresses.

After the NLP engine 508 is trained, during the inference phase, the NLP engine 508 receives the natural language input 506 from the client device 502 (or multiple client devices involved in the video conference) and produces the image generation prompt 510. The image generation prompt may be produced before the video conference (e.g., based on the natural language input 506 the title and/or other information about the video conference) or during the video conference (e.g., in real-time based on text or speech generated during the video conference).

After the image generation prompt 510 is prepared, the server 504 uses image generation or image search technology to generate virtual background imagery based on the image generation prompt. If image search technology is used, the server 504 searches a data repository for an appropriate image (e.g., an image having tags or metadata associated with the image generation prompt 510). The appropriate image may be a still image, a moving image, or a video. As illustrated in FIG. 5, image generation is used. The image generation prompt 510 is provided to an image generation engine 512. The image generation engine 512 generates the virtual background 514 based on the image generation prompt 510.

In some implementations, the image generation engine 512 utilizes a transformer architecture to generate imagery (e.g., a still image, a moving image, or a video) based on an image generation prompt, which may include natural language text (or other representations of natural language data). In some cases, the image generation engine 512 operates in multiple phases, including a textual encoding phase, an image decoding phase, and an image refinement phase.

In the textual encoding phase, the image generation prompt 510 is processed by a transformer encoder of the image generation engine 512. The transformer artificial neural network (TANN) architecture of the transformer encoder analyzes the semantic and syntactic relationships within the image generation prompt 510, extracting key concepts and translating them into a latent representation suitable for image generation.

In the image decoding phase, the latent representation from the transformer encoder is fed into a transformer decoder, which is another TANN. The transformer decoder, which may be trained on a dataset of image-text pairs, gradually refines the latent information into an image representation. The process used by the transformer decoder involves iteratively predicting pixel values and their relationships, guided by the encoded prompt and internal knowledge.

In the image refinement phase, the initial image generated by the transformer decoder is further refined to increase the quality of the image and the adherence to the image generation prompt 510. Several techniques may be used in the image refinement phase. For example, using attention mechanisms, the image generation engine 512 selectively focuses on specific parts of the image being generated and the prompt, ensuring consistency and coherence. Using progressive up-sampling, image generation engine 512 starts from a low-resolution image and progressively refines details and textures of the low-resolution image. Using style transfer, if the image generation prompt 510 specifies a desired artistic style, the image generation engine 512 incorporates style elements from reference images of that artistic style or stored style data (e.g., from a style data repository) to achieve the desired visual effects.

Upon completion of the image refinement phase, the image generation engine 512 outputs the final image (which may be a still image, a moving image, or a video), which corresponds to the virtual background 514. The virtual background 514 may be used in the video conference and/or may be stored at the server 504 or at the client device 502 for use in other video conferences. In some cases, stored data of the virtual background 514 may be shared (e.g., with other users associated with a same UCaaS software platform customer as the user of the client device 502) to enable others to use the virtual background 514. Thus, a library of virtual backgrounds created according to the approaches disclosed herein may be maintained for individual users, sets of users, individual customers of a software platform that utilizes the system 500, or sets of such customers.

During the video conference, the server 504 receives, from the client device 502, camera generated imagery 516. The server 504 uses a composite image generator 518 to combine the virtual background 514 and the camera generated imagery 516 to generate a composite image 520. The server 504 transmits the composite image 520 to the client device 502 and, in some cases, to other client devices connected to the video conference.

The camera generated imagery 516 includes a stream of images generated by a camera of the client device 502 during the video conference. The camera generated imagery 516 is provided to the composite image generator 518 of the server 504. In alternative implementations, the composite image generator 518 resides at the client device 502 and receives the virtual background 514 from the server 504.

The composite image generator 518 identifies human body features (e.g., at least one of a face, a torso, an arm, or a leg) in the camera generated imagery 516. The composite image generator 518 may use an artificial neural network (ANN) that is trained to extract human body features from imagery, for example, via object recognition. The ANN may be trained using images of humans, with the part of the image that includes a human labeled (e.g., by a human user). The ANN may include a layer or a sub-network that detects edges and is trained to detect edges based on labeled edges within imagery that includes humans and/or thing that are different from humans.

In some cases, if the user of the client device 502 has a chroma key (e.g., a green screen or another single-colored screen or wall) behind themselves, chroma keying may be used to identify the human body features. The human body features of the user may be identified by separating out the parts of the camera generated imagery that are of the single color (e.g., green if the green screen is used) and including only the pixels that are of colors different from the single color as the human body features.

After the human body features are identified, the composite image generator 518 overlays the human body features over the virtual background 514 to obscure part of the virtual background 514, generating the composite image 520. In the composite image 520, the human body features may be resized to have a specified size (e.g., a predefined size or a similar size to human body features of other participants). Alternatively, instead of obscuring parts of the virtual background 514, parts of the virtual background (e.g., moving parts) may occasionally obscure the human body features. For example, if the virtual background includes balls being thrown around, a ball may occasionally be thrown in front of a torso of the user of the client device 502, thereby obscuring the torso. However, to keep the viewer's attention on the user's face and to avoid distraction by the virtual background, the user's face might never be obscured by the ball.

In some implementations, the image generation engine 512 includes a decoder-only transformer that autoregressively generates the virtual background 514. An example implementation of autoregressive generation using the decoder-only transformer is described in detail below.

In some implementations of autoregressive generation, the decoder-only transformer includes multiple layers of self-attention mechanisms and feedforward neural networks. Some NLP engines include both encoder and decoder components. However, the decoder-only transformer includes only a decoder component that decodes the input text into an image (which may include a still image, a moving graphic, and/or a video).

During autoregressive generation, the decoder-only transformer tokenizes the natural language input describing the desired image (i.e., the image generation prompt 510) into smaller units (words, subwords, or characters) and then transforms those smaller units into fixed-dimensional embeddings. These embeddings represent the semantic meaning of the input tokens and serve as the initial input to the decoder-only transformer. Positional encoding is added to the input embeddings to provide information about the order or position of tokens in the input sequence. This enables the decoder-only transformer to consider the sequential structure of the natural language input.

In some implementations, the decoder-only transformer comprises multiple layers, each containing self-attention mechanisms. These mechanisms allow the decoder-only transformer to weigh the importance of different parts of the input text while generating the corresponding visual features. Self-attention enables the model to capture dependencies and relationships between different words or tokens in the natural language input.

According to some implementations, as the decoder-only transformer processes the natural language input through its layers, it progressively generates image features or visual representations at each decoding step. These representations are refined and adjusted based on the attention mechanisms, allowing the decoder-only transformer to focus on relevant parts of the natural language input to create the corresponding visual features.

Within each decoder layer, the multi-head attention mechanism allows the decoder-only transformer to attend to different parts of the input text simultaneously. Additionally, feedforward neural networks within each layer further process the information and refine the generated image features.

The final layer of the decoder-only transformer processes the generated visual features to reconstruct or generate the output image. This layer might employ additional artificial neural network components or transformations to convert the visual features into a coherent and accurate representation of the image corresponding to the natural language input.

The image generation engine 512 may be trained in a multi-phase training process. In a first phase of the training, the image generation engine 512 is trained to generate an image from a natural language input. The natural language input may be unrelated to video conferencing. In a second phase of the training, the image generation engine 512 is finetuned to generate virtual backgrounds (e.g., the virtual background 514) for video conferencing. In a third phase of the training, the image generation engine 512 is trained to adjust the virtual background based on attention data or distraction data of participants in the video conference.

In some implementations, an account administrator of the platform can (e.g., manually or automatically) maintain a blacklist/whitelist of language (e.g., words, phrases, or tokens) that is tagged as appropriate language or inappropriate language. The inappropriate language might not be included in the image generation input. Alternatively, some inputs might be explicitly included in the image generation input. For example, in some regions or industries, some content is inappropriate, while in other regions or industries, the same content might be appropriate. In addition, there might be an overall filter for generally inappropriate (e.g., sexual, violent, or profane) content which is not affected by any whitelist of language.

Figure 6:
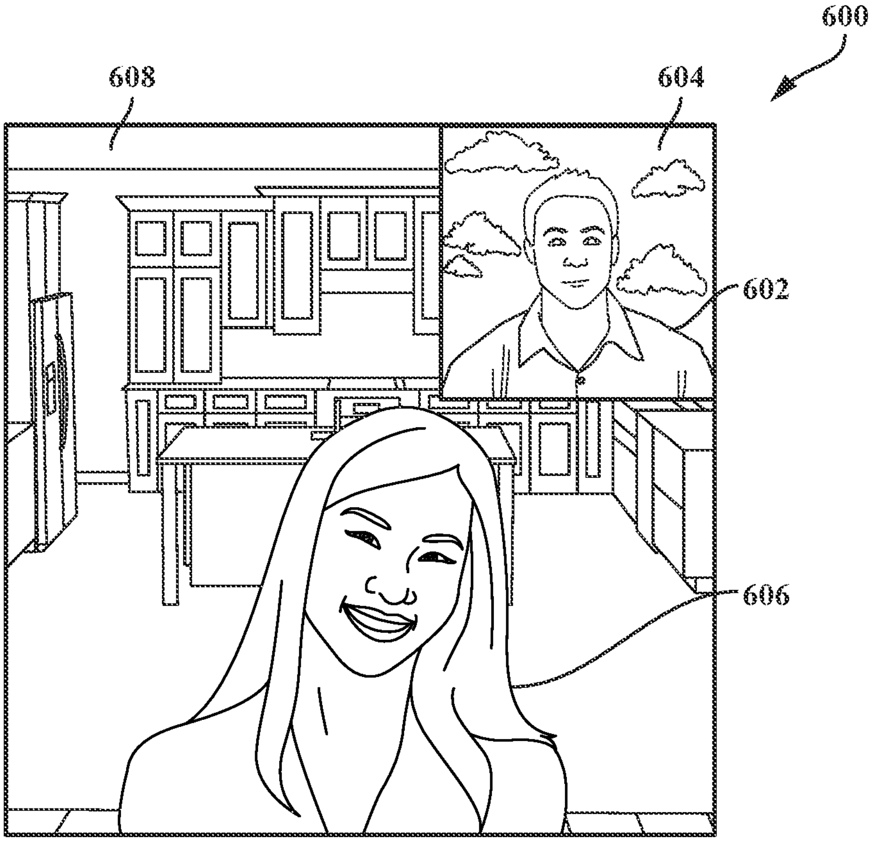
FIG. 6 illustrates a first example graphical user interface of a video conference.

FIG. 6 illustrates a first example graphical user interface (GUI) 600 of a video conference. As shown, the GUI 600 includes a thumbnail image of a first user 602 with a virtual background 604. The GUI 600 includes a primary image of a second user 606 with a non-virtual background 608. The GUI 600 may be displayed, for example, at the client device 502 of FIG. 5. The thumbnail image may correspond to the composite image 520, with the virtual background 604 corresponding to part of the virtual background 514, and imagery of the first user 602 corresponding to human body features from the camera generated imagery 516. The first user 602 may be the user of the client device 502.

Figure 7:
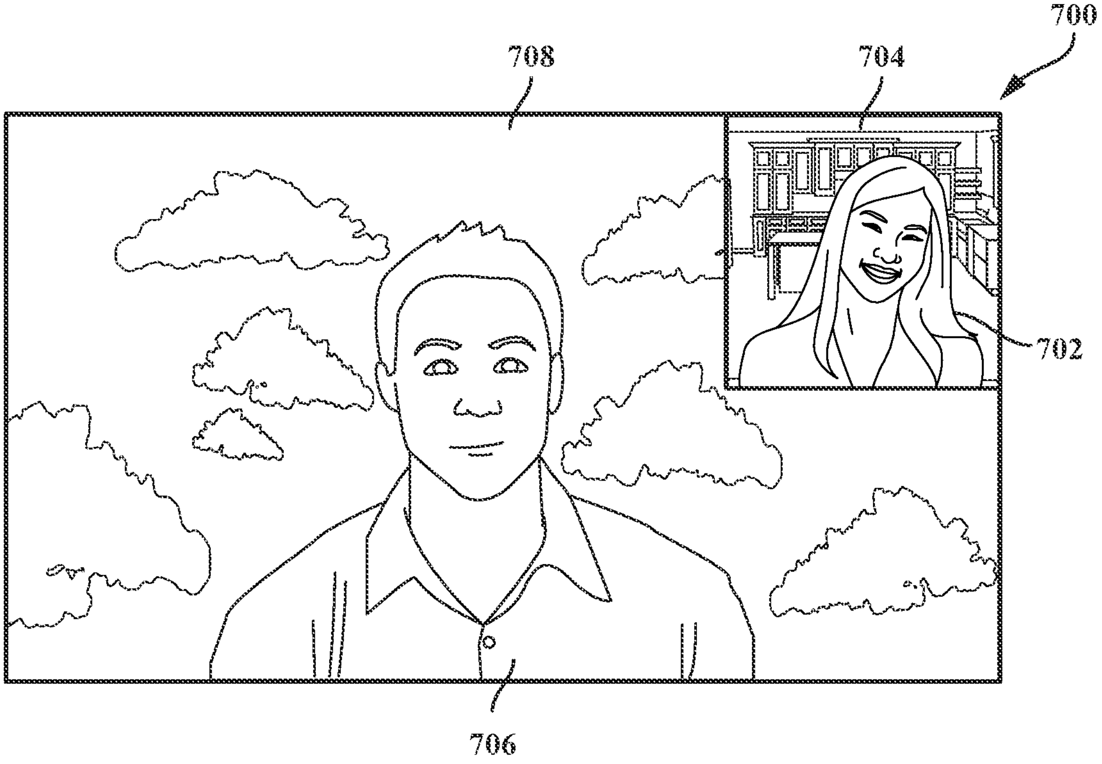
FIG. 7 illustrates a second example graphical user interface of a video conference.

FIG. 7 illustrates a second example GUI 700 of a video conference. The GUI 700 may be displayed at a computing device different from the client device 502 that is connected to the video conference, for example, the computing device of the second user. As shown, the GUI 700 includes a thumbnail image of the second user 702 with the non-virtual background 704. The second user 702 corresponds to the second user 606, and the non-virtual background 704 corresponds to the non-virtual background 608. The GUI 700 includes a primary image of the first user 706 with the virtual background 708. The first user 706 corresponds to the first user 602, and the virtual background 708 corresponds to the virtual background 604.

As illustrated in FIGS. 6-7 and described above, the client device 502 of the first user displays a primary image of the second user and a thumbnail image of the first user. The computing device of the second user displays a primary image of the first user and a thumbnail of the second user. As a result, each of the users has the experience of seeing the person they are speaking to occupying most of the GUI that they see. Also, each of the users sees a thumbnail image of themselves, so that they are aware of how they appear to the other user in the video conference.

Figure 8:
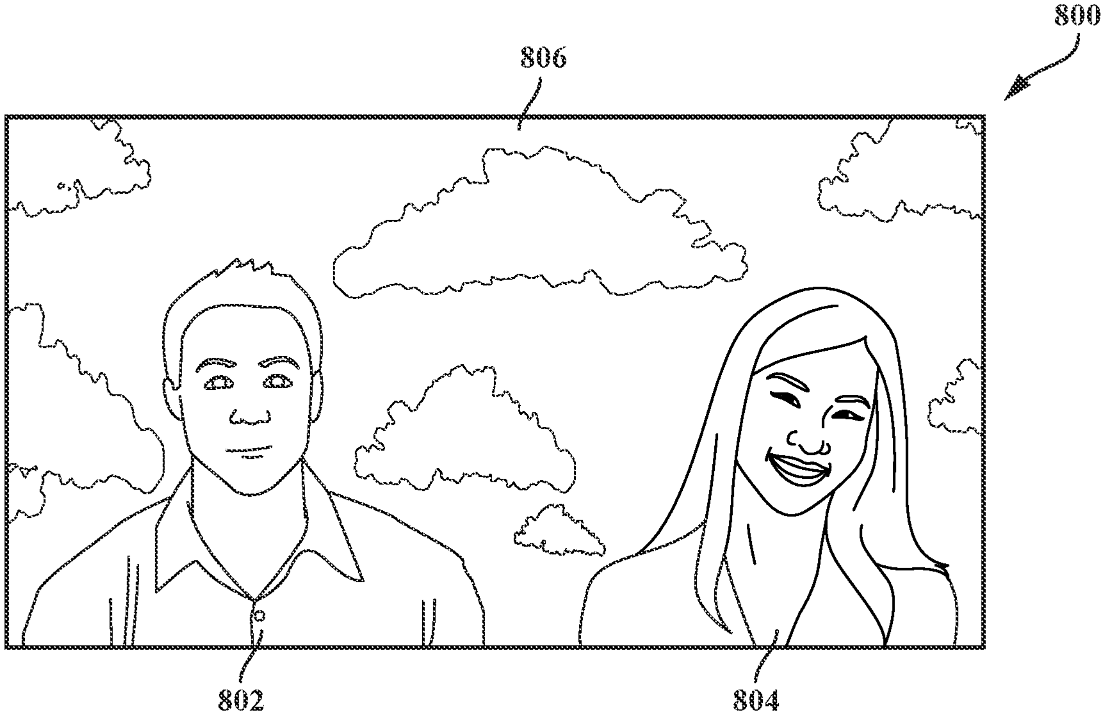
FIG. 8 illustrates a third example graphical user interface of a video conference.

FIG. 8 illustrates a third example GUI 800 of a video conference. As shown, the GUI 800 illustrates two users 802, 804 adjacent to one another. The user 802 is a user of the client device 502 and the user 804 is a user of a computing device different from the client device 502 that is connected to the video conference. The GUI 800 may be displayed at either the client device 502 or the computing device. The users 802, 804 are surrounded by a virtual background 806. The virtual background 806 is an immersive virtual background that surrounds both of the users. When using an immersive virtual background, multiple users (e.g., all or a portion of the users sharing imagery of their human body features to the video conference) are pictured adjacent to one another and surrounded by the virtual background.

Figure 9:
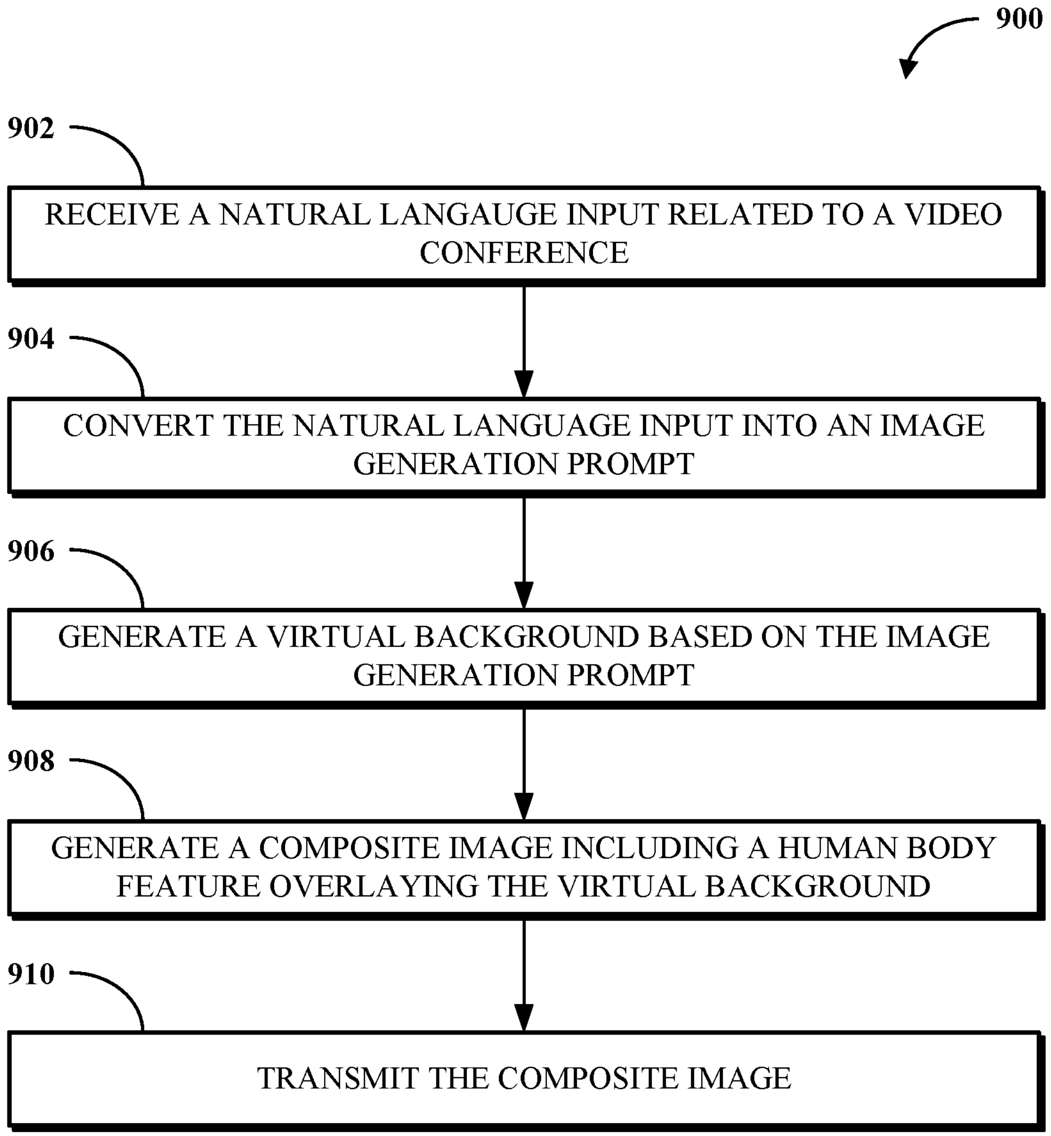
FIG. 9 is a flowchart of an example of a technique for generating a video conferencing image with a virtual background.
Figure 10:
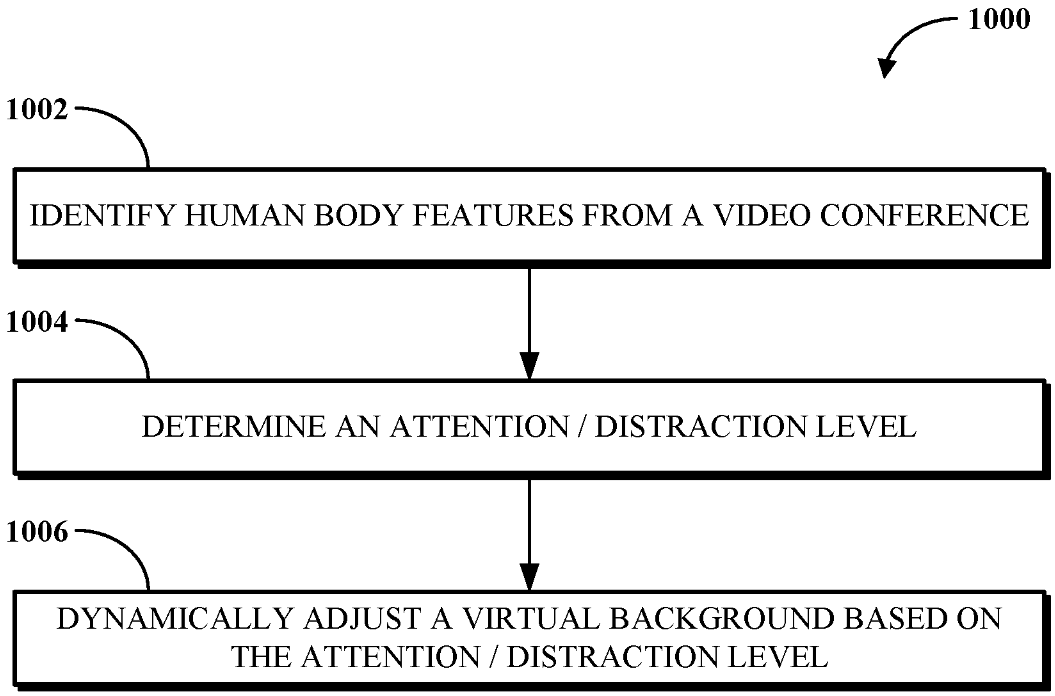
FIG. 10 is a flowchart of an example of a technique for dynamically adjusting a virtual background in a video conference.

To further describe some implementations in greater detail, reference is next made to examples of techniques which may be performed by or using a system for transformer-based virtual background creation. FIG. 9 is a flowchart of an example of a technique 900 for generating a video conferencing image with a virtual background. FIG. 10 is a flowchart of an example of a technique 1000 for dynamically adjusting a virtual background in a video conference. The techniques 900, 1000 can be executed using computing devices, such as the systems, hardware, and software described with respect to FIGS. 1-8. The techniques 900, 1000 can be performed, for example, by executing a machine-readable program or other computer-executable instructions, such as routines, instructions, programs, or other code. The steps, or operations, of the techniques 900, 1000, or another technique, method, process, or algorithm described in connection with the implementations disclosed herein can be implemented directly in hardware, firmware, software executed by hardware, circuitry, or a combination thereof.

For simplicity of explanation, the techniques 900, 1000 are depicted and described herein as a series of steps or operations. However, the steps or operations of the techniques 900, 1000 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 9 illustrates the technique 900 for generating the video conferencing image with the virtual background. As described below, the technique 900 is performed by a server, for example, the server 504 of FIG. 5. Alternatively, the technique 900 may be performed by another device such as a client connected to the video conference, or by the server working in conjunction with the client.

At 902, the server receives a natural language input related to a video conference. The natural language input may include at least one of a title, an agenda, words spoken during the video conference, or text typed into a text-based chat session of the video conference. In some cases, the natural language input may be obtained from data associated with the host or the participants of the video conference. For example, if the video conference is to be attended by participants in the mining industry, (e.g., as determined based on public social media profiles of the participants) the natural language input may include "mining" or "mining industry." In some cases, the natural language may be an explicit prompt for a virtual background by a user. For example, a user may request a virtual background based on user-generate text (or audio/video representations of natural language), such as "New York City street scene during rush hour."

At 904, the server converts, using a natural language processing engine, the natural language input into an image generation prompt for a virtual background of the video conference. The natural language processing engine may include a general-purpose LLM or a general-purpose GPT that is finetuned to generate image generation prompts based on natural language data associated with a video conference. In some cases, the image generation prompt is identical to the natural language input. Alternatively, the image generation prompt may be different (e.g., a different string) from the natural language input, and may be computed based on the natural language input.

At 906, the server generates, using an image generation engine of the server, the virtual background based on the image generation prompt. The virtual background may be an individual virtual background for an individual user participating in the video conference (e.g., the virtual background 604 or the virtual background 708). Alternatively, the virtual background may be an immersive virtual background for multiple participants of the video conference (e.g., the virtual background 806). The immersive virtual background may be associated with a GUI illustrating multiple users positioned adjacent to one another in front of the immersive virtual background.

The virtual background may be a still image, a moving graphic, or a video. For example, in response to the natural language input including the text: "New York City street scene during rush hour," the server may generate (e.g., using artificial intelligence technology as described herein) a synthetic photograph of multiple cars, buses, and taxis on a New York City street. Alternatively, the server may generate a synthetic moving graphic (e.g., a graphic that repeats every two seconds or other time period) of the cars, buses, and taxis moving down the street. In the moving graphic, the same cars, buses, and taxis may be shown repeatedly. In another alternative, the server may generate a synthetic video that includes cars, buses, and taxis moving down the street, with different cars, buses, and taxis shown at every instance (e.g., as though the viewer was looking at real traffic on a real street in New York City).

As used herein, the term "synthetic" may include data that is generated by a machine, as opposed to data that exists in the real world. For example, a photograph taken by a digital camera is not a synthetic photograph because that photograph corresponds to a scene in the real world. However, a photograph generated using the artificial intelligence techniques disclosed herein is a synthetic photograph.

At 908, the server generates a composite image comprising at least one human body feature overlaying the virtual background. In some cases, the virtual background is designed first and a human body feature, recognized from camera generated imagery, overlays the virtual background. In some cases, the virtual background is generated in real-time during the video conference, the human body feature is identified for display, and only parts of the virtual background that are not obscured by the human body feature are generated. For example, if the virtual background includes a forest scene, the forest scene might be generated not to occupy a full rectangle, but to occupy a rectangle with a head-shaped piece cut out of it at the bottom center of the rectangle. If a size, shape, and/or orientation of a device connected to the video conference is available to the server, the server may adjust the dimensions of the rectangle based on the size, shape, and/or orientation of the device. Similarly, the virtual background may be adjusted based on a screen resolution of the device.

At 910, the server transmits the composite image to client devices connected to the video conference. The composite image is transmitted to the client devices for display in a visual output associated with the video conference. The visual output may be displayed within a window, a page, or an application associated with the video conference.

As described above, the same virtual background for imagery of a given user is transmitted to all of the devices connected to the video conference that display imagery associated with the given user. However, in some cases, different virtual backgrounds (for imagery of the same user) may be transmitted to different device. For example, Anna, Bill, and Carol might be connected to a video conference, with Anna using a virtual background including a video depicting traffic moving on a highway. Bill might indicate (e.g., via settings in an account associated with a video conferencing service) that he is easily distracted by moving objects. Based on the information that Bill is easily distracted, Anna's virtual background on Bill's device might be modified to include still traffic rather than moving traffic. Carol's device would continue to display Anna's virtual background with the moving traffic, as Carol did not indicate that she is easily distracted by moving object or by any other features of Anna's virtual background.

In some cases, to protect Bill's privacy, Anna might not be notified of the changes of her virtual background on Bill's device. Alternatively, Anna might be modified that some users would not be comfortable with her proposed virtual background, and Anna might be able to select an alternative virtual background for those users using a GUI associated with the video conference.

In some cases, the virtual background presented to at least one user (e.g., at least one of Bill or Carol) may be modified during the video conference based on an attention level or a distraction level of that user. For example, if Carol becomes distracted by the moving traffic, Anna's virtual background, as displayed on Carol's device, might switch from moving traffic to still traffic. One example of a technique for modifying the virtual background based on the attention level or the distraction level is described in conjunction with FIG. 10.

In an example use case of the disclosed technology, Adam, Betsy, and Cindy are having a video conference to discuss a company retreat. The video conference is set, by the host, Adam, to have an immersive virtual background with the content of the virtual background being set based on what is said in the video conference. Initially, the virtual background depicts a hotel lobby, as this content is relevant to the company retreat theme. Adam kicks off the video conference by saying, "I think we should consider a beach destination." In response, the server changes the virtual background to show a beach scene with an ocean, palm trees, and sand. The video conference attendees discuss various beach destinations with this virtual background. Later, Betsy says, "Perhaps a skiing destination like Tahoe would be better, as we could drive there." In response, the server modifies the virtual background to depict a car driving on a snowy road with skis on the roof Cindy likes the virtual background with the car and uses the GUI of the video conference to download that virtual background to her computing device, for use in other video conferences that Cindy attends.

FIG. 10 illustrates the technique 1000 for dynamically adjusting the virtual background in the video conference. As described below, the technique 1000 is performed by a server, for example, the server 504 of FIG. 5. Alternatively, the technique 1000 may be performed by another device such as a client connected to the video conference, or by the server working in conjunction with the client.

At 1002, the server identifies human body features from a video conference. The human body features may be identified (e.g., using artificial intelligence techniques) from the visual data shared during the video conference. For example, the human body features may include faces (or other human body parts) shown during the video conference that are surrounded by a virtual background or a camera generated background.

At 1004, the server determines at least one of an attention level or a distraction level based on the human body features. The server may determine the attention level or the distraction level using a trained machine learning engine. The trained machine learning engine may be trained based on a dataset that includes imagery of humans that are paying attention and imagery of humans that are distracted. As used herein, the attention level may refer, among other things, to a numerical value representing an engagement of one or more participants in the video conference with the video conference. The distraction level may refer, among other things, to a numerical value representing a disengagement of one or more participants in the video conference with the video conference or an attention level applied to things other than the video conference (e.g., other computing devices, such as a mobile phone of a participant connected to the video conference by laptop computer or desktop computer).

At 1006, the server dynamically adjusts the virtual background, using an image generation engine, (e.g., the image generation engine 512) based on at least one of the attention level or the distraction level. For example, if the server determines that multiple users are distracted by the virtual background of a first user (e.g., a host or a speaker of the video conference), the server may modify the virtual background of the first user to make it less distracting. For example, the resolution of the virtual background may be reduced. Alternatively, if the virtual background includes moving imagery, the virtual background may be converted to still imagery. If the virtual background is very colorful, the virtual background may be modified to include fewer or less vibrant colors. In another alternative, the virtual background may be replaced with a black-and-white virtual background or even a virtual background including a single color (e.g., blue).

In an example use case of the disclosed technology, a teacher, Tom, is teaching a class about the four seasons in New England. Tom sets his account with the video conferencing server to automatically generate a virtual background based on what he is discussing during the class. When Tom discusses winter, a wintry scene of a snow-covered town square is shown as the virtual background of Tom. Occasionally, pedestrians or vehicles travel through the town square. Furthermore, the pedestrians might go into or out of vehicles, or might open and close doors of shops in the town square. However, the scene does not repeat as different movements of pedestrians or vehicles are generated in real-time.

When Tom discusses spring, Tom appears in a springtime forest with wildlife including deer, woodchucks, squirrels, rabbits, coyotes, and lynx. During Tom's discussion of spring, the meeting chat mentions the cute animals, and the students whose cameras are turned on appear to be distracted by the scenery and not paying attention to Tom. Based on the distraction level of the students, the server modifies Tom's virtual background to include a still springtime forest scene without any animals being depicted. After the virtual background is changed, fewer students are distracted and more of the students are paying attention to what Tom is saying.

Tom likes the still virtual background that is used during the spring discussion. Thus, Tom saves this virtual background for use in other video conferences that he attends. The virtual background may be stored at the server in association with Tom's account and/or at Tom's client device. If Tom's employer has access to Tom's account with the video conferencing service, Tom's employer may save the still virtual background for use by other teachers and/or by a substitute teacher in Tom's class when Tom is not available.

Some implementations are described below as numbered examples (Example 1, 2, 3, etc.). These examples are provided as examples only and do not limit the other implementations disclosed herein.

Example 1 is a method, comprising: converting, using a natural language processing engine of a server, a natural language input into an image generation prompt for a virtual background of a video conference; generating, using an image generation engine of the server, the virtual background based on the image generation prompt; generating, by the server, a composite image comprising at least one feature overlaying the virtual background; and transmitting, by the server, for display, in a visual output associated with the video conference, the composite image.

In Example 2, the subject matter of Example 1 includes, wherein the natural language input comprises at least one of a title of the video conference, an agenda of the video conference, natural language data associated with at least one of a host or a participant of the video conference, words spoken during the video conference, or text typed in a text-based chat session of the video conference.

In Example 3, the subject matter of Examples 1-2 includes, wherein the at least one feature comprises at least one human body feature, wherein the virtual background comprises at least one of an immersive virtual background overlaid by human body features of all participants or an individual virtual background overlaid by the at least one human body feature of a single participant.

In Example 4, the subject matter of Examples 1-3 includes, wherein the virtual background comprises at least one of a still image, a moving graphic, or a video.

In Example 5, the subject matter of Examples 1-4 includes, wherein the virtual background comprises a first virtual background transmitted to a first client device connected to the video conference and a second virtual background transmitted to a second client device connected to the video conference, wherein the first virtual background is different from the second virtual background, wherein the first virtual background is selected based on information associated with the first client device, and wherein the second virtual background is selected based on information associated with the second client device.

In Example 6, the subject matter of Examples 1-5 includes, identifying human body features, including the at least one feature, from the video conference; determining at least one of an attention level or a distraction level based on the human body features; and dynamically adjusting the virtual background, using the image generation engine, based on the at least one of the attention level or the distraction level.

In Example 7, the subject matter of Examples 1-6 includes, wherein the image generation engine comprises a decoder-only transformer configured to autoregressively generate the virtual background.

In Example 8, the subject matter of Examples 1-7 includes, training the image generation engine using multi-phase training, a first phase of the multi-phase training comprising training the image generation engine to generate an image from a natural language input, a second phase of the multi-phase training finetuning the image generation engine to generate virtual backgrounds, and a third phase of the multi-phase training finetuning the image generation engine to adjust virtual backgrounds based on at least one of attention data or distraction data.

In Example 9, the subject matter of Examples 1-8 includes, wherein the natural language processing engine comprises at least one of a large language model or a generative pretrained transformer.

Example 10 is a non-transitory computer readable medium storing instructions operable to cause one or more processors to perform operations comprising: converting, using a natural language processing engine of a server, a natural language input into an image generation prompt for a virtual background of a video conference; generating, using an image generation engine of the server, the virtual background based on the image generation prompt; generating, by the server, a composite image comprising at least one feature overlaying the virtual background; and transmitting, by the server, for display, in a visual output associated with the video conference, the composite image.

In Example 11, the subject matter of Example 10 includes, wherein the natural language input comprises at least one of a title of the video conference, an agenda of the video conference, words spoken during the video conference, or text typed in a text-based chat session of the video conference.

In Example 12, the subject matter of Examples 10-11 includes, wherein the at least one feature comprises at least one human body feature, wherein the virtual background comprises an immersive virtual background overlaid by human body features of all participants.

In Example 13, the subject matter of Examples 10-12 includes, wherein the virtual background comprises at least one of a moving graphic or a video.

In Example 14, the subject matter of Examples 10-13 includes, wherein the virtual background comprises a first virtual background transmitted to a first client device and a second virtual background transmitted to a second client device, wherein the first virtual background is different from the second virtual background, wherein the first virtual background is selected based on information associated with a user of the first client device, and wherein the second virtual background is selected based on information associated with a user of the second client device.

In Example 15, the subject matter of Examples 10-14 includes, the operations comprising: identifying human body features, including the at least one feature, from the video conference; determining an attention level based on the human body features; and dynamically adjusting the virtual background, using the image generation engine, based on the attention level.

In Example 16, the subject matter of Examples 10-15 includes, wherein the image generation engine autoregressively generates the virtual background.

In Example 17, the subject matter of Examples 1-16 includes, wherein the natural language processing engine comprises a large language model.

Example 18 is a system, comprising: a memory subsystem; and processing circuitry configured to execute instructions stored in the memory subsystem to: convert, using a natural language processing engine of a server, a natural language input into an image generation prompt for a virtual background of a video conference; generate, using an image generation engine of the server, the virtual background based on the image generation prompt; generate, by the server, a composite image comprising at least one feature overlaying the virtual background; and transmit, by the server, for display, in a visual output associated with the video conference, the composite image.

In Example 19, the subject matter of Example 18 includes, wherein the natural language input comprises at least one of a title of the video conference, an agenda of the video conference, natural language data associated with at least one of a host or a participant of the video conference, or words spoken during the video conference.

In Example 20, the subject matter of Examples 18-19 includes, the processing circuitry configured to execute the instructions stored in the memory subsystem to: identify human body features, including the at least one feature, from the video conference; determine a distraction level based on the human body features; and dynamically adjust the virtual background, using the image generation engine, based on the distraction level.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

As used herein, unless explicitly stated otherwise, any term specified in the singular may include its plural version. For example, "a computer that stores data and runs software," may include a single computer that stores data and runs software or two computers—a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer-readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry. The memory subsystem may include a single memory unit or multiple joint or disjoint memory units, which each of the multiple joint or disjoint memory units storing all or a portion of the data described as being stored in the memory subsystem.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device. Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

converting, using a natural language processing engine of a server, a natural language input into an image generation prompt for a virtual background of a video conference;

generating, using an image generation engine of the server, the virtual background based on the image generation prompt;

generating, by the server, a composite image comprising at least one feature overlaying the virtual background, wherein the at least one feature comprises at least one human body feature recognized from camera generated imagery, and wherein only parts of the virtual background that are not obscured by the at least one human body feature are generated;

transmitting, by the server, for display in a visual output associated with the video conference, the composite image;

monitoring, by the server, words spoken during the video conference to identify a change in subject matter being discussed;

generating, using the image generation engine and based on identifying the change in subject matter, a second virtual background based on at least a subset of the words spoken during the video conference after the change in subject matter; and transmitting, by the server, for display in the visual output, a second composite image comprising at least one second feature overlaying the second virtual background.

2. The method of claim 1, wherein the natural language input comprises at least one of a title of the video conference, an agenda of the video conference, natural language data associated with at least one of a host or a participant of the video conference, the words spoken during the video conference, or text typed in a text-based chat session of the video conference.

3. The method of claim 1, wherein the at least one feature comprises at least one human body feature, wherein the virtual background comprises at least one of an immersive virtual background overlaid by human body features of all participants or an individual virtual background overlaid by the at least one human body feature of a single participant.

4. The method of claim 1, wherein the virtual background comprises at least one of a still image, a moving graphic, or a video.

5. The method of claim 1, wherein the virtual background comprises a first virtual background transmitted to a first client device connected to the video conference and an additional virtual background transmitted to a second client device connected to the video conference, wherein the first virtual background is different from the additional virtual background, wherein the first virtual background is selected based on information associated with the first client device, and wherein the additional virtual background is selected based on information associated with the second client device.

6. The method of claim 1, comprising:
identifying human body features, including the at least one feature, from the video conference;
determining at least one of an attention level or a distraction level based on the human body features; and
dynamically adjusting the virtual background, using the image generation engine, based on the at least one of the attention level or the distraction level.

7. The method of claim 1, wherein the image generation engine comprises a decoder-only transformer configured to autoregressively generate the virtual background.

8. The method of claim 1, comprising:
training the image generation engine using multi-phase training, a first phase of the multi-phase training comprising training the image generation engine to generate an image from a natural language input, a second phase of the multi-phase training finetuning the image generation engine to generate virtual backgrounds, and a third phase of the multi-phase training finetuning the image generation engine to adjust virtual backgrounds based on at least one of attention data or distraction data.

9. The method of claim 1, wherein the natural language processing engine comprises at least one of a large language model or a generative pretrained transformer.

10. The method of claim 1, wherein the natural language processing engine comprises a large language model.

11. The method of claim 1, further comprising:
generating, by the server, the second composite image comprising the at least one second feature overlaying the second virtual background, wherein the second virtual background is different from the virtual background, wherein the at least one second feature is obtained, by a camera of a client device, at a later time than the at least one feature.

12. The method of claim 1, further comprising:
adjusting, by the server, dimensions of the composite image based on at least one of a size, a shape, or an orientation of a device to which the second composite image is transmitted.

13. A non-transitory computer readable medium storing instructions operable to cause one or more processors to perform operations comprising:
converting, using a natural language processing engine of a server, a natural language input into an image generation prompt for a virtual background of a video conference;
generating, using an image generation engine of the server, the virtual background based on the image generation prompt;
generating, by the server, a composite image comprising at least one feature overlaying the virtual background, wherein the at least one feature comprises at least one human body feature recognized from camera generated imagery, and wherein only parts of the virtual background that are not obscured by the at least one human body feature are generated;
transmitting, by the server, for display in a visual output associated with the video conference, the composite image;
monitoring, by the server, words spoken during the video conference to identify a change in subject matter being discussed;
generating, using the image generation engine and based on identifying the change in subject matter, a second virtual background based on at least a subset of the words spoken during the video conference after the change in subject matter; and
transmitting, by the server, for display in the visual output, a second composite image comprising at least one second feature overlaying the second virtual background.

14. The non-transitory computer readable medium of claim 13, wherein the natural language input comprises at least one of a title of the video conference, an agenda of the video conference, the words spoken during the video conference, or text typed in a text-based chat session of the video conference.

15. The non-transitory computer readable medium of claim 13, wherein the at least one feature comprises at least one human body feature, wherein the virtual background comprises an immersive virtual background overlaid by human body features of all participants.

16. The non-transitory computer readable medium of claim 13, wherein the virtual background comprises at least one of a moving graphic or a video.

17. The non-transitory computer readable medium of claim 13, wherein the virtual background comprises a first virtual background transmitted to a first client device and an additional virtual background transmitted to a second client device, wherein the first virtual background is different from the additional virtual background, wherein the first virtual background is selected based on information associated with a user of the first client device, and wherein the additional virtual background is selected based on information associated with a user of the second client device.

18. The non-transitory computer readable medium of claim 13, the operations comprising:
accessing human body features, including the at least one feature, from the video conference;
determining an attention level based on the human body features; and
dynamically adjusting the virtual background, using the image generation engine, based on the attention level.

19. The non-transitory computer readable medium of claim 13, wherein the image generation engine autoregressively generates the virtual background.

20. A system, comprising:
a memory subsystem; and
processing circuitry configured to execute instructions stored in the memory subsystem to:
convert, using a natural language processing engine of a server, a natural language input into an image generation prompt for a virtual background of a video conference;
generate, using an image generation engine of the server, the virtual background based on the image generation prompt;
generate, by the server, a composite image comprising at least one feature overlaying the virtual background, wherein the at least one feature comprises at least one human body feature recognized from camera generated imagery, and wherein only parts of the virtual background that are not obscured by the at least one human body feature are generated;

transmit, by the server, for display in a visual output associated with the video conference, the composite image;

monitor, by the server, words spoken during the video conference to identify a change in subject matter being discussed;

generate, using the image generation engine and based on identifying the change in subject matter, a second virtual background based on at least a subset of the words spoken during the video conference after the change in subject matter; and transmit, by the server, for display in the visual output, a second composite image comprising at least one second feature overlaying the second virtual background.

21. The system of claim 20, wherein the natural language input comprises at least one of a title of the video conference, an agenda of the video conference, natural language data associated with at least one of a host or a participant of the video conference, or the words spoken during the video conference.

22. The system of claim 20, the processing circuitry configured to execute the instructions stored in the memory subsystem to:

access human body features, including the at least one feature, from the video conference;

determine a distraction level based on the human body features; and dynamically adjust the virtual background, using the image generation engine, based on the distraction level.

* * * * *